United States Patent [19]

Bakken et al.

[11] 4,063,787

[45] Dec. 20, 1977

[54] CYLINDRICAL, FLEXIBLE BEARINGS

[75] Inventors: Gordon J. Bakken, Brigham City; Richard A. Anderson, Tremonton, both of Utah

[73] Assignee: Thiokol Corporation, Newtown, Pa.

[21] Appl. No.: 765,145

[22] Filed: Feb. 3, 1977

[51] Int. Cl.² .............................................. F16F 1/38
[52] U.S. Cl. .............................. 308/26; 29/149.5 NM; 267/57.1 R; 308/184 R; 416/134 R
[58] Field of Search ............... 29/149.5 NM; 64/11 R; 267/57.1 R, 63 R; 308/2 A, 26, 184 R, 237 R, 238, 244, DIG. 8; 416/134 R, 134 A, 141, 102

[56] References Cited

U.S. PATENT DOCUMENTS 3,071,422  1/1963  Hinks ........................... 267/57.1 R X
3,834,181  9/1974  Strasburg et al. ........... 416/134 R X Primary Examiner—Stephen G. Kunin Attorney, Agent, or Firm—Stanley A. Marcus; Edward E. McCullough

[57] ABSTRACT

Flexible bearings of the type constructed of alternate, clyindrical layers of rigid material, or shims, and elastomer bonded together are made substantially free of internal, tensile stresses by making the walls of the shims wedge-shaped and by alternating the thin and thick ends of adjacent shims. As the elastomer cures and cools during manufacture of the bearing, it typically shrinks in volume, causing residual tensile stresses in prior-art cylindrical bearings. However, this shrinkage causes the shims of the present invention to move together axially, thus relieving the stress. If there is an odd number of shims, there is no axial displacement of the inner mounting ring of the bearing relative to the outer mounting ring, as a result of elastomer shrinkage. Alternatively, all shims may be initially held out of alignment, so that shrinkage of the elastomer will pull them into alignment.

8 Claims, 5 Drawing Figures

CYLINDRICAL, FLEXIBLE BEARINGS

BACKGROUND OF THE INVENTION

This invention relates broadly to flexible bearings. More specifically, it relates to bearings constructed of alternate, concentric, annular layers of elastomer and rigid material, each layer being bonded to adjacent layers; and to such bearings that are substantially free of internal, tensile stresses. The Government has rights in this invention pursuant to Contract No. DAAJ02-73-C-0091, awarded by the U.S. Army.

There are many uses for cylindrical bearings of the type having alternate, annular, concentric layers of elastomer and rigid material bonded together. A use of particular concern in the present invention is for supporting helicopter rotors relative to the central hub thereof. In such an application, the bearings are subjected to omnidirectional, random forces, as well as to predominating forces in vertical directions. Whenever the bearing is subjected to a side force, the portion between the center of the bearing and the impressed force is under compression, while the opposite half of the bearing is under tensile stresses. Bearings of this nature perform very well under compression; but are very weak under tension and tend to fail at the bond interfaces between the elastomeric and rigid layers. This tendency is aggravated by the fact that the elastomeric layers of such bearings usually have built-in tensile stresses caused by shrinkage during cure and cooling of the elastomer when the bearing is manufactured.

Flexible bearings of the type described herein are well known and are shown in patents such as in U.S. Pat. Nos. 3,787,102 to Moran; 3,750,249 to Brandon et al; and 2,995,907 to Orain. None of these patents, however, is concerned with the problem and solution therefor that comprises the subject matter of the present invention; i.e., means of producing such bearings that are free of internal, tensile stresses.

SUMMARY OF THE INVENTION

The present invention is directed toward solving this problem of tensile stresses in cylindrical, elastomeric bearings.

Objects of the invention are to provide a cylindrical, elastomeric bearing that will automatically relieve tensile stresses within itself, whether such stresses are the result of elastomeric shrinkage in volume during its cure cycle or the result of a side force being impressed on the bearing.

The invention is essentially a cylindrical, elastomeric bearing made of annular, concentric shims or layers of rigid material, spaced apart radially and filled between the shims with an elastomer that is bonded to the shims. The improvement is that the interior and exterior surfaces of each shim are opposing cones, so that the shim wall is wedge-shaped, as viewed in longitudinal section. The shims are arranged so that the thick and thin ends of adjacent shims are alternated. Because of this arrangement, the shims are drawn together axially to compensate for the decrease in volume of elastomer, as it shrinks during its cure cycle. Hence, the internal tensile stresses that are ordinarily built into cylindrical, elastomeric bearings of this type are eliminated in the present invention.

An unexpected and valuable feature of the invention is that, if there is an odd number of shims, the relative displacements of adjacent shims cancel each other out, so that there is no net axial displacement of the inner mounting ring of the bearing relative to the outer mounting ring, as a result of elastomer shrinkage and axial movement of the shims.

In one embodiment of the invention, adjacent shims are deliberately placed out of alignment with one another when the liquid elastomer is installed; so that they are drawn into alignment as the elastomer shrinks during its cure and cooling cycles.

In another embodiment of the invention, some of the shims having wedge-shaped walls are replaced by shims wherein the interior and exterior surfaces are parallel cones, for greater economy.

In some applications of the invention, such as for attaching a helicopter rotor to the central hub thereof, the principle loads exerted on the bearing are side forces in vertical directions relative to the helicopter. For such uses, an alternate embodiment of the invention automatically relieves tensile stresses in the elastomer that are induced by such side forces. In this embodiment, the cylindrical assembly of shims and elastomer is made in the form of two half-cylinders enclosed in an outer retaining and mounting ring. The half cylinders are oriented so that the split between them is at right angles to the predominant side force. With this arrangement, one of the half-cylinders is placed under compression, and tensile stresses are induced in the other when the side force is impressed thereon. However, the shims will shift axially in both, but in opposite directions, to compensate for the type of stress to which each half-cylinder is subjected. The shims under compression move apart, while those under tension move together to relieve stresses.

Other objects and advantages of the invention will become apparent as the following, detailed descriptions are read with reference to the accompanying drawings. The same parts are designated with the same numbers throughout the disclosure.

DESCRIPTION OF THE PREFERRED EMBODIMENTS

Figure 1:
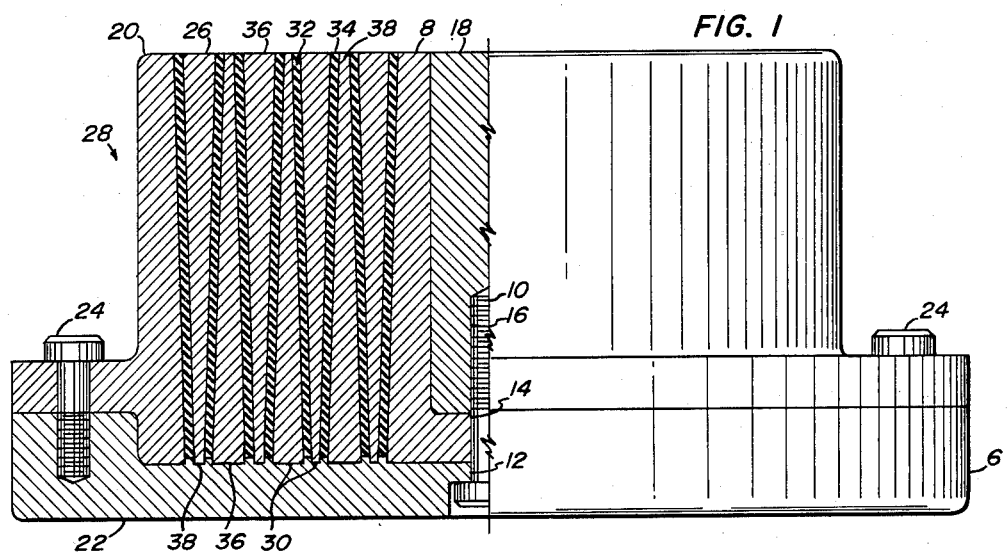
FIG. 1 is a half-sectioned, side elevation of the invention, shown in the mold in which it is manufactured.

In a preferred embodiment of the invention, all rigid parts of the bearing are: rough machined from steel, according to the desired dimensions; ultrasonically inspected for possible flaws; and fine machined. After final inspections, the parts are grit blasted to enhance adhesion of the elastomer thereto.

A natural, uncured, rubber formulation is then prepared and tested for the desired viscosity and shear modulus. A typical, preferred formulation is, in parts by weight:

Raw latex . . . 100
Carbon black . . . 30
Zinc oxide . . . 5
Sulfur . . . 0.6
Zinc 2-Ethyl hexanoate . . . 2
2-Morpholinothio benzothiazole . . . 1.44
Tetrabutylthiuram disulphide . . . 0.6
Poly-2,2,4-trimethyl 1-1,2-dihydroquinoline . . . 2

The latex is Standard Malaysian Rubber Grade No. 5. The tetrabutylthiuram disulfide is available under the trade name, "Butyl Tuads," from the R. T. Vanderbilt Company of Los Angeles, Calif. The 2-morpholinothio benzothiazole is sold under the trade name, "Santocure MOR" from the Monsanto Company of St. Louis, Missouri. The poly-2,2,4-trimethyl 1-1,2-dihydroquinoline is available under the trade name, "Flectol H," also from Monsanto Company of St. Louis, Missouri. All ingredients are mixed together and thoroughly blended in a mechanical mixer, typically in 400 lb. batches.

The rigid parts are then placed in a mold 6, wherein the inner mounting ring 8 is secured and centered by a screw 10 that passes through a central hole 12 in the mold 6, a central hole 14 in the inner ring 8, and engages a threaded hole 16 in the centering block 18. The block 18 is shaped to fit inside the inner mounting ring 8 with close tolerances to prevent any movement thereof. The outer mounting ring 20 is similarly maintained in a fixed position and is used as a part of the mold 6, which, in this embodiment of the invention, comprises the outer mounting ring 20 fixed to a base member 22 by screws 24. The rigid layers or shims 26 of the bearing 28 are held in position by concentric grooves 30 in the base member 22 of the mold 6.

When all mechanical parts are in place in the mold 6, the entire assembly and the uncured rubber composition are heated to about 200° F. This is the temperature at which fluidity of the rubber composition is greatest. The liquid rubber is then pressed into the equal spaces 32 between the concentric shims 26. After about one-half hour at an elevated temperature (about 300° F), the rubber 34 is cured or polymerized into annular, elastomeric pads bonded between the shims 26.

As shown in FIG. 1, the exterior and interior surfaces of each shim 26 are opposing, conical surfaces, so that the wall of each shim 26 is wedge-shaped in longitudinal section. The shims 26 are arranged so that the thick ends 36 and thin ends 38 of adjacent shims are alternated; so that, as the elastomer shrinks in volume during its cure cycle, the shims move together to compensate for the change in volume and relieve tensile stresses. This axial motion of the shims is induced by the axial components of tensile force resulting from the inclined surfaces of the shims 26.

Figure 2:
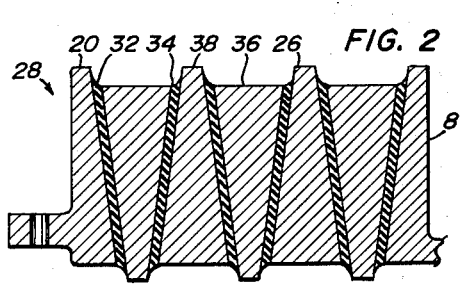
FIG. 2 is a fragmentary section of the invention wherein angles, thicknesses, and relative displacements of the shims, as a result of volumetric shrinkage of the elastomer, are exaggerated for the purpose of illustration.

FIG. 2 is an exaggerated view showing the relative displacements of adjacent shims 26. An examination of this view will show that, if there is an even number of shims 26 between the outer ring 20 and the inner ring 8, then the inner ring 8 will be axially displaced relative to the outer ring 20. Also, since this displacement results from shrinkage in volume of the rubber pads 34, the extent of the displacement cannot be predicted with precision. However, if there is an odd number of shims 26 between the outer ring 20 and the inner ring 8, then the relative displacements of the shims 26 cancel each other out so that there is no axial displacement of the inner ring 8 relative to the outer ring 20. Because of this valuable and unexpected discovery, shrinkage of the elastomer may be neglected by designers.

Figure 5:
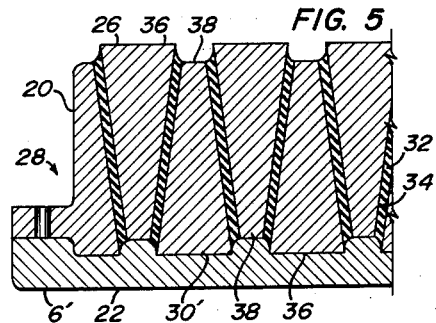
FIG. 5 is similar to FIG. 2, but shows a fourth embodiment of the invention wherein adjacent shims are molded, with the elastomer, in out-of-alignment positions, so that they are drawn into alignment by shrinkage of the elastomer during its cure and cooling cycles.

This problem of axial displacement of the shims 26 relative to one another may also be solved as shown in FIG. 5. When the axial displacement between adjacent shims has been empirically determined for a specific elastomer in a bearing of specific design, this distance may be built into adjacent grooves 30' of the mold 6'. In effect, adjacent shims 26 are held out of alignment with one another by the grooves 30' at the beginning of the molding process. Then, as the elastomer 34 cures and cools, it pulls the adjacent shims into alignment with one another. Hence, this method produces a finished bearing in which there is no relative axial displacement between any of the shims.

Figure 4:
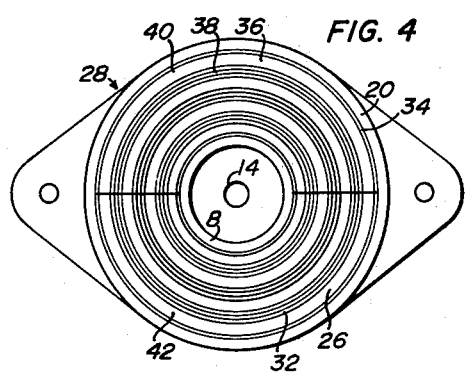
FIG. 4 is an end view of a third embodiment of the invention.

In some applications of the bearing 28, such as its use for attaching the rotors of a helicopter to the central hub thereof, the bearing 28 is subjected to predominant side forces (caused, in this instance, by the tendency of helicopter rotors to oscillate in vertical directions). When a side force is impressed on such a bearing, and the inner mounting ring 8 thereof is being held stationary relative to the helicopter, then the portion of the bearing between the force and the inner mounting ring 8 is under compression while the opposite half of the bearing is under tensile stress. Such transitory stresses are automatically and instantaneously alleviated by the embodiment of the invention shown in FIG. 4, wherein the assembly of shims 26 and elastomer 34 (except for the inner and outer rings, 8 and 20), is divided into two half-cylinders 40 and 42, which are oriented so that the division between them is perpendicular to the predominant side force. This embodiment of the invention is preferably made by sawing the assembly of shims 26 and cured elastomer 34 into two half-cylinders, so that the edges thereof match perfectly and any side force impressed on one half-cylinder is transmitted to the shims of the other half-cylinder. Hence, adjacent shims 26 will automatically move together axially in one half of the bearing 28 to relieve tensile stresses in the elastomer 34, while the shims 26 move slightly apart axially to relieve excessive compression in the other half-cylinder.

Figure 3:
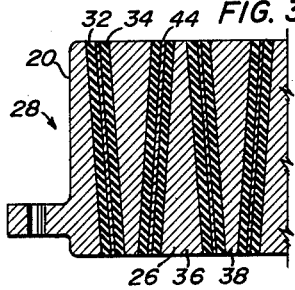
FIG. 3 is similar to FIG. 2, but shows another embodiment of the invention.

Another embodiment of the invention is shown in FIG. 3. In this embodiment, the number of shims 26 that are wedge-shaped in longitudinal section is minimized by replacing some of them with intermediate shims 44 having parallel inner and outer conical surfaces. One or more shim 44 may be embedded in the elastomer 34 between any two adjacent shims 26. The shims 44 function in the same manner as the shims 26 to relieve stresses in the elastomer 34, i.e., by relative axial movement. The use of the shims 44 not only reduces the cost of the bearing 28 somewhat; but, also, they enhance the ease of designing such a bearing for specified mechanical properties.

A number of rubber compositions, other than that described above, have been found to be useful in elastomeric bearings of the type described, including synthetic rubbers, and are well known in the art. The present invention is applicable to bearings using any such material that shrinks during its cure and cooling cycle. Also, rigid materials other than steel may be useful and desirable for use in making the cylinders 26 for specific applications of the bearing 28. Other details of process and construction of the invention may be altered without departing from the scope of the invention, as it is defined in the following claims.

The invention claimed is:

1. An annular, flexible bearing, comprising:
   a plurality of annular, concentric, rigid shims, spaced apart radially, each shim having opposing interior and exterior conical surfaces so that the wall thereof is wedge-shaped, and each shim has a thick end and a thin end, the thick and thin ends of adjacent shims being alternated; and
   a cured elastomer in the spaces between the shims and bonded thereto to form an integral assembly, whereby, as the elastomer shrinks during its cure cycle, adjacent shims are drawn toward one another axially to relieve tensile stresses that would otherwise remain in the elastomer.

2. The annular, flexible bearing of claim 1 having an odd number of shims, so that shrinkage of the elastomer during its cure cycle does not affect the axial position of the innermost shim relative to that of the outermost shim.

3. The annular, flexible bearing of claim 1 including at least one thin, intermediate shim between two adjacent shims, the intermediate shim having parallel interior and exterior conical surfaces so that the wall thereof does not vary in thickness.

4. The annular, flexible bearing of claim 1 further including an inner mounting ring, fixed to the inner portion of the bearing for retaining the bearing and mounting it to adjacent parts; and an outer mounting ring fixed to the outer surface of the bearing for retaining the bearing and mounting it to adjacent parts.

5. The annular, flexible bearing of claim 4 wherein the inner and outer mounting rings are bonded to adjacent surfaces of the bearing.

6. The annular flexible bearing of claim 4 wherein the assembly of shims and elastomer is divided into two half-cylinders having matching shims, so that side forces impressed on one half-cylinder are transmitted to the shims of the other half-cylinder.

7. The annular, flexible bearing of claim 1 wherein the elastomer comprises, in approximate parts by weight:
   Raw latex . . . 100
   Carbon black . . . 30
   Zinc oxide . . . 5
   Sulfur . . . 0.6
   Zinc 2-Ethyl hexanoate . . . 2
   2-Morpholinothio benzothiazole . . . 1.44
   Tetrabutylthiuram disulphide . . . 0.6
   Poly-2,2,4-trimethyl 1-1,2-dihydroquinoline . . . 2

8. In a cylindrical, flexible bearing having concentric, annular, rigid shims spaced apart radially and a cured elastomer filling the spaces between the shims and bonded thereto, wherein the interior and exterior surfaces of each shim are opposing, conical surfaces, so that the walls thereof are wedge-shaped, having a thick end and a thin end, and wherein the thick and thin ends of adjacent shims are alternated, and wherein the elastomer shrinks in volume during its cure and cooling cycle, thereby drawing the shims together axially, the method of producing such a bearing wherein all of the shims are axially aligned with one another, comprising:
   placing all said shims in concentric positions;
   spacing said alternate shims apart axially by the same distance that they are drawn together axially by the elastomer as it cures and cools;
   filling the spaces between the shims with the elastomer in its uncured state; and
   curing and cooling the elastomer, so that the shims are drawn into axial alignment with one another as the elastomer shrinks in volume.

* * * * *